US009524386B2

(12) United States Patent
Lee et al.

(10) Patent No.: US 9,524,386 B2
(45) Date of Patent: Dec. 20, 2016

(54) METHOD AND APPARATUS FOR PROCESSING DOCUMENT IN TOUCH-SENSITIVE DEVICE

(71) Applicant: Samsung Electronics Co., Ltd., Gyeonggi-do (KR)

(72) Inventors: Kyuchang Lee, Incheon (KR); Yonggil Han, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/244,501

(22) Filed: Apr. 3, 2014

(65) Prior Publication Data

US 2014/0317759 A1   Oct. 23, 2014

(30) Foreign Application Priority Data

Apr. 17, 2013  (KR) .................. 10-2013-0042076

(51) Int. Cl.
*G06F 21/45* (2013.01)
*G06F 3/0483* (2013.01)
*G06F 3/0488* (2013.01)
*G06F 21/62* (2013.01)

(52) U.S. Cl.
CPC ............ *G06F 21/45* (2013.01); *G06F 3/0483* (2013.01); *G06F 3/04883* (2013.01); *G06F 21/62* (2013.01)

(58) Field of Classification Search
None
See application file for complete search history.

(56) References Cited

U.S. PATENT DOCUMENTS

| 8,380,710 | B1 * | 2/2013 | Finne et al. .................. 707/723 |
| 2004/0158587 | A1 * | 8/2004 | Shay et al. .................... 707/201 |
| 2008/0079979 | A1 * | 4/2008 | Holt et al. .................... 358/1.14 |
| 2013/0330021 | A1 * | 12/2013 | Bansal et al. ................ 382/309 |
| 2013/0332850 | A1 * | 12/2013 | Bovet et al. .................. 715/752 |
| 2014/0033024 | A1 * | 1/2014 | Gartland et al. ............. 715/244 |
| 2014/0115725 | A1 * | 4/2014 | Seo et al. ........................ 726/30 |
| 2014/0218393 | A1 * | 8/2014 | Lee et al. ...................... 345/619 |
| 2014/0281954 | A1 * | 9/2014 | Ullrich et al. ................ 715/702 |

* cited by examiner

*Primary Examiner* — Kaveh Abrishamkar
(74) *Attorney, Agent, or Firm* — The Farrell Law Firm, P.C.

(57) ABSTRACT

A method and apparatus are provided for processing a document in a touch-sensitive device by performing a document locking function in order not to expose a specific portion that contains significant content requiring security or confidentiality in a document, and by unlocking a locked portion of a document. In the method, when a document locking input is detected from a displayed document, the displayed document is folded in a direction of a first drag input. Thereafter, when the first drag input is removed, the displayed document is locked by completing the folding of the displayed document.

20 Claims, 20 Drawing Sheets

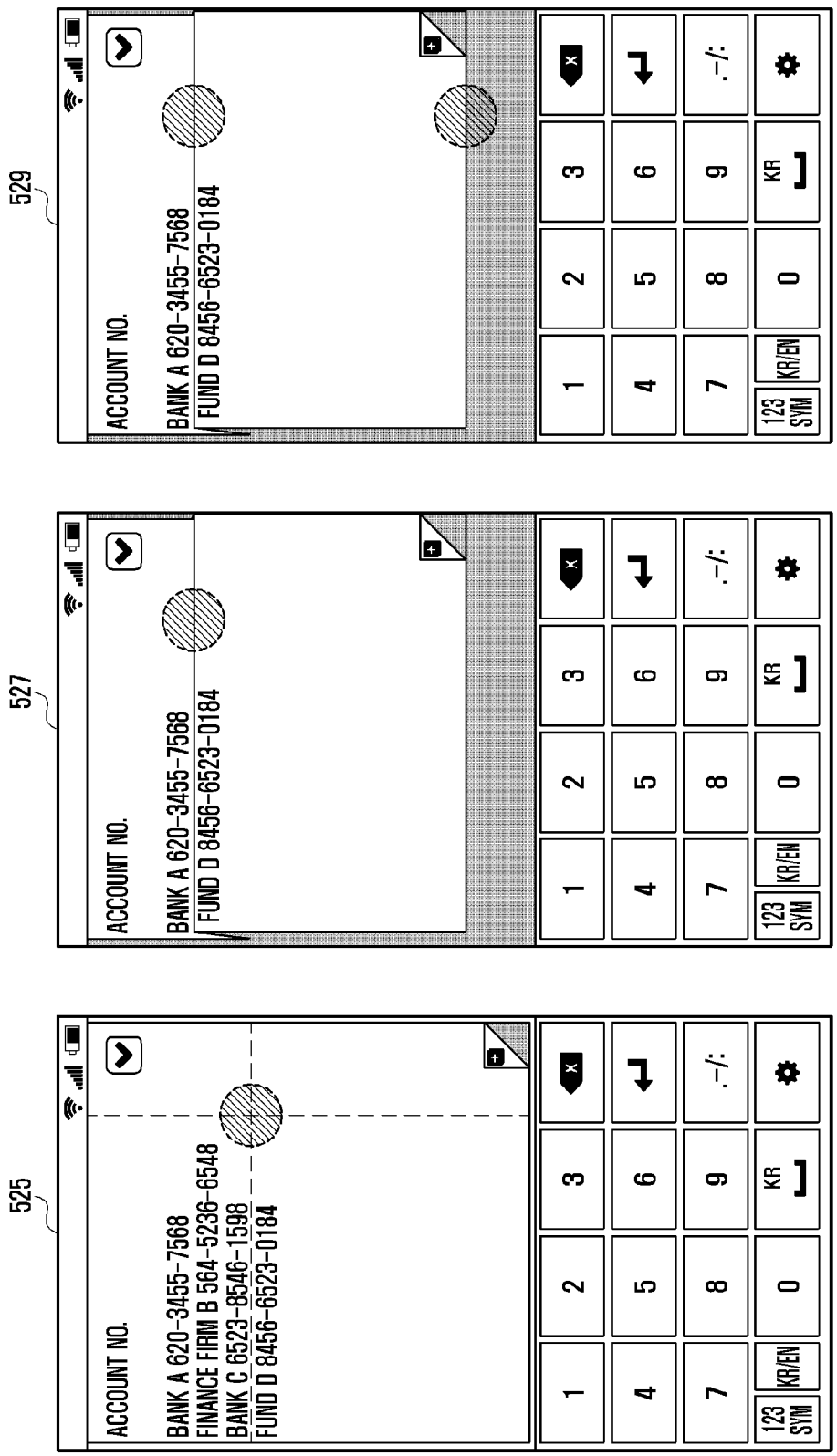

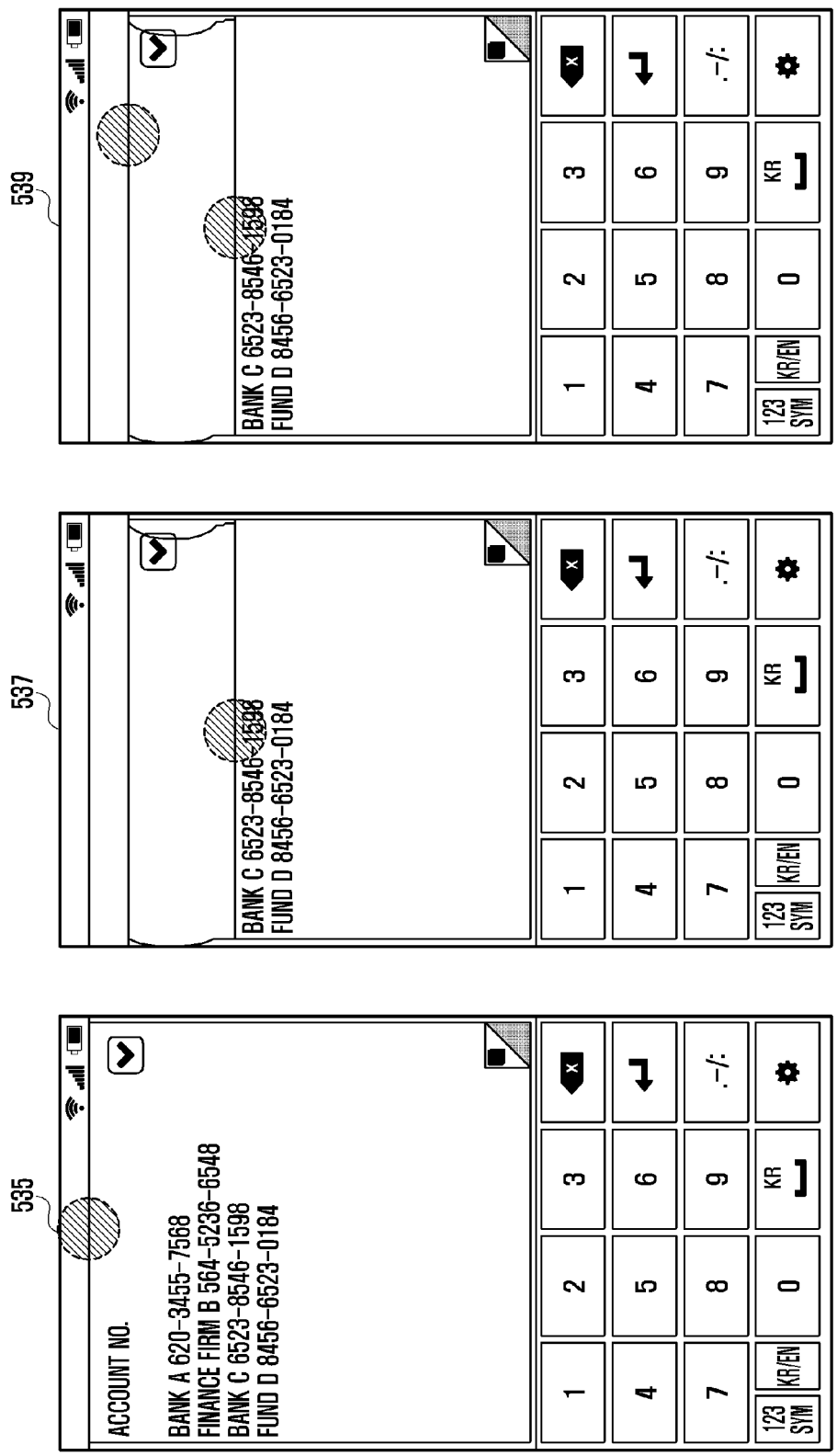

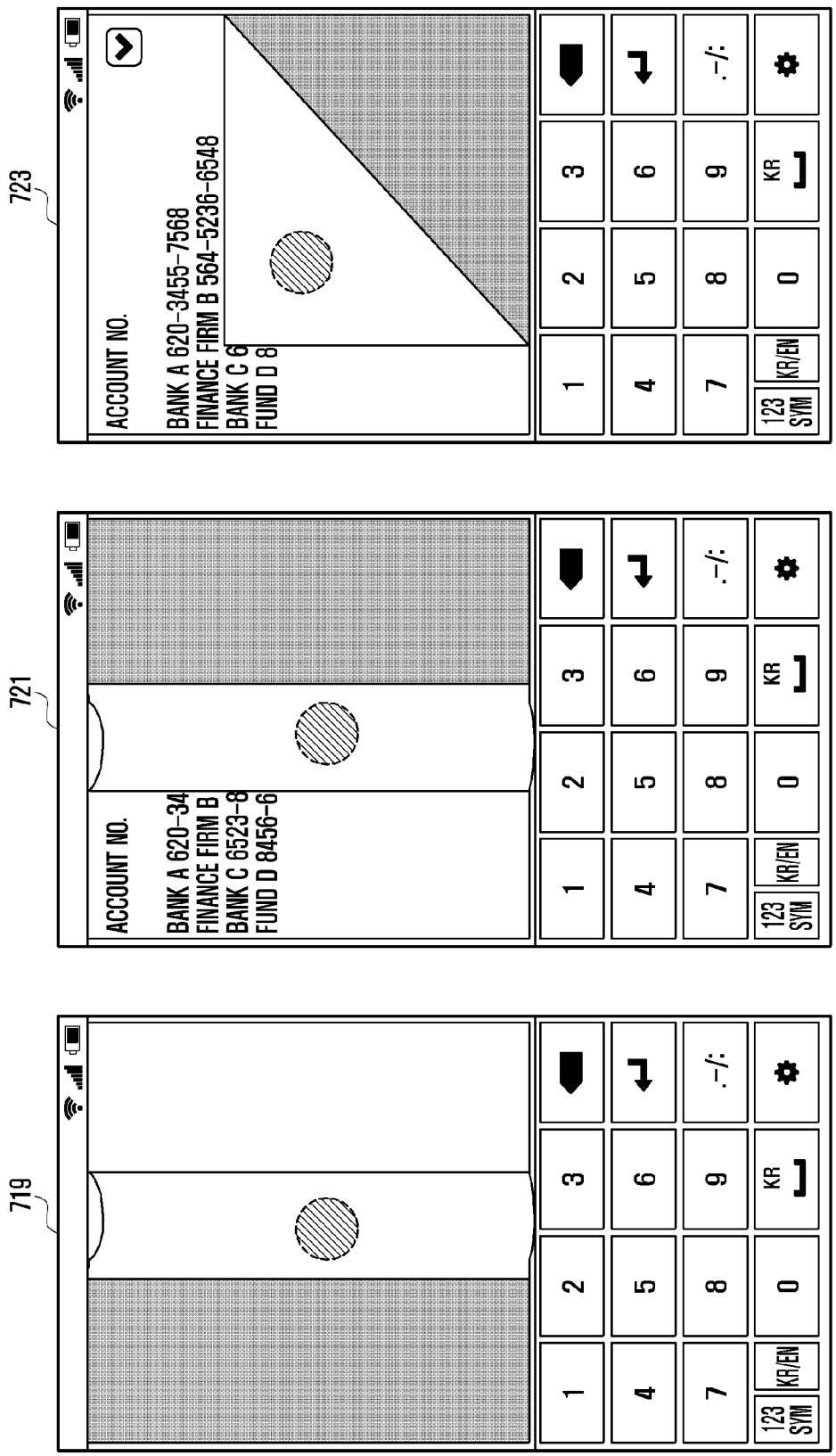

METHOD AND APPARATUS FOR PROCESSING DOCUMENT IN TOUCH-SENSITIVE DEVICE

PRIORITY

This application claims priority under 35 U.S.C. §119(a) to a Korean Patent Application filed on Apr. 17, 2013 in the Korean Intellectual Property Office and assigned Serial No. 10-2013-0042076, the entire disclosure of which is incorporated herein by reference.

1. Field of the Disclosure

The present disclosure generally relates to technology for processing a document in a touch-sensitive device, and more particularly, to a method and apparatus for locking and/or unlocking the content of a document in a touch-sensitive device.

2. Description of the Related Art

Mobile devices, such as a smart phone, a PDA (Personal Digital Assistant), a tablet PC, and the like, have become increasingly popular due to their high usability and good portability. Nowadays, most of mobile devices have a touch screen that allows touch-based manipulations.

Such a mobile device inherently or optionally offers various functions, e.g., a call, a message transmission, an email, a document creation, a memo, a camera, a scheduler, a Social Networking Service (SNS), and the like.

Particularly, through document and memo functions, a mobile device can store and manage various types of information about a user. Where any document or memo contains significant information (e.g., an account number, a password, etc.) that requires security or confidentiality, a function to lock a document or memo is needed such that the contents of a document or memo cannot be exposed to other persons.

SUMMARY

The present disclosure had been made to address the above problems and disadvantages, and to provide at least the advantages described below. Accordingly, an aspect of the present disclosure provides a method and apparatus for processing a document in a touch-sensitive device by performing a document locking function in order not to expose a specific portion that contains significant content requiring security or confidentiality in a document, and by unlocking a locked portion of a document.

Another aspect of the present disclosure provides a method and apparatus for locking or unlocking a document displayed in a touch-sensitive device by folding or unfolding the document in a specific direction corresponding to a user's input.

According to an aspect of the present disclosure, a method for processing a document in a touch-sensitive device is provided. The method includes displaying the document; when a document locking input is detected from the displayed document, folding the displayed document in a direction of a first drag input; and when the first drag input is removed, locking the displayed document by finishing the folding of the displayed document.

According to another aspect of the present disclosure, an apparatus for processing a document in a touch-sensitive device is provided. The apparatus includes a touch panel configured to detect a document locking input and a document unlocking input; a display unit configured to display a locked document or an unlocked document; and a control unit configured to control the display unit to display the locked document by folding the displayed document in a direction of a first drag input when the document locking input is detected from the displayed document through the touch panel, and to control the display unit to display the unlocked document by unfolding the displayed document in a direction of a second drag input when the document unlocking input is detected from the displayed document through touch panel.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIGS. 5A to 5J are screenshots illustrating various processes of locking a document in a touch-sensitive device in accordance with embodiments of the present disclosure;

FIGS. 7A to 7E are screenshots illustrating various processes of unlocking a document in a touch-sensitive device in accordance with embodiments of the present disclosure.

DETAILED DESCRIPTION OF EMBODIMENTS OF THE PRESENT DISCLOSURE

The following description with reference to the accompanying drawings is provided to assist in a comprehensive understanding of various embodiments of the present disclosure as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a document" includes reference to one or more of such documents.

In this specification, a touch-sensitive device includes, but is not limited to, a mobile phone, a smart phone, a notebook, a laptop computer, a tablet PC, a handheld PC, a digital broadcasting terminal, a Personal Digital Assistant (PDA), a Portable Multimedia Player (PMP), a navigation terminal, a media player, a mobile medical device, a digital camera, a portable game console, an electronic dictionary, an electronic scheduler, a wearable device, and any other equivalent devices.

Figure 1:
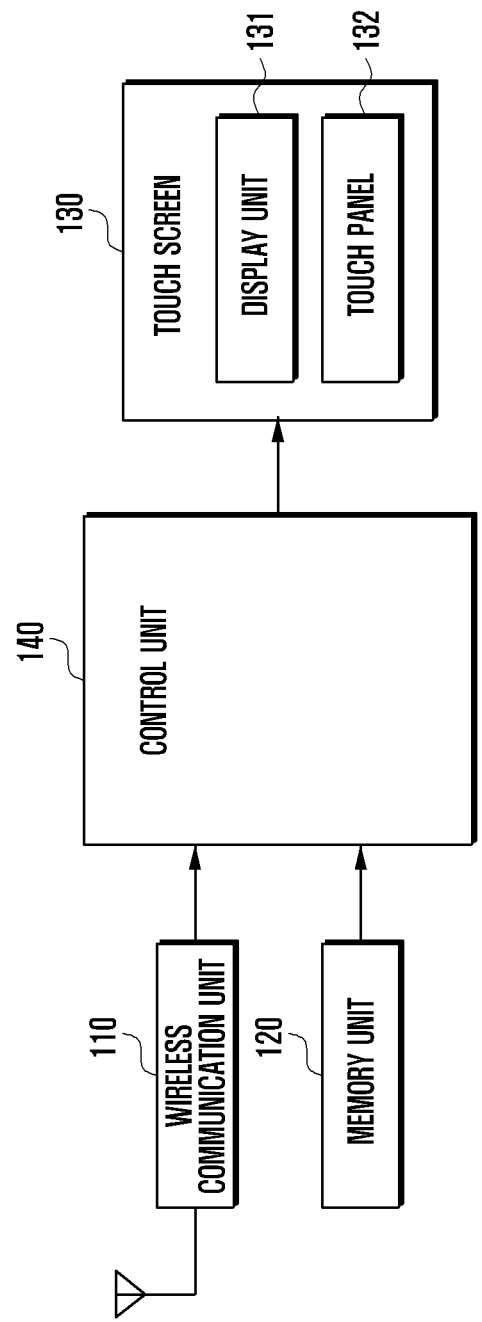
FIG. 1 is a block diagram illustrating a touch-sensitive device in accordance with an embodiment of the present disclosure.

FIG. 1 is a block diagram illustrating a touch-sensitive device in accordance with an embodiment of the present disclosure.

Referring to FIG. 1, the touch-sensitive device 100 includes a wireless communication unit 110, a memory unit 120, a touch screen 130, and a control unit 140.

The wireless communication unit 110 performs a voice call, a video call, or data communication with any external device through a network. The wireless communication unit 110 may include a Radio Frequency (RF) transmitter that up-converts the frequency of an outgoing signal and amplifies the signal, an RF receiver that amplifies with low-noise an incoming signal and down-converts the frequency of the signal, and the like. Further, the wireless communication unit 110 may include a modulator and a demodulator, which may provide a specific communication service such as CDMA, WCDMA, LTE, WiFi, Wibro, NFC, Bluetooth, or the like. The wireless communication unit 110 may be formed of a mobile communication module, an internet communication module, and/or a short-range communication module. In some embodiments, the wireless communication unit 110 may have LTE, WiFi, NFC, and Bluetooth communication modules.

The memory unit 120 includes a program memory for storing operation programs of the touch-sensitive device, and a data memory for storing data created during the execution of programs.

The touch screen 130 is composed of a display unit 131 and a touch panel 132. The display unit 131 displays a variety of screens in connection with the use of the touch-sensitive device under the control of the control unit 140. The display unit 131 may be formed of a Liquid Crystal Display (LCD), Organic Light Emitted Diode (OLED), Active Matrix OLED (AMOLED), a flexible display, or any other equivalent device.

Particularly, under the control of the control unit 140, the display unit 131 displays a document creation screen, a locked or unlocked document, a password input window, a menu for locking or unlocking a document, and the like.

The touch panel 132 may be a complex touch panel that is composed of a finger touch panel for detecting a finger gesture and a pen touch panel for detecting a pen gesture. The finger touch panel may be a capacitive type, a resistive type, an infrared type, or an ultrasonic type. The finger touch panel creates a touch event by a user's finger gesture or any other equivalent (e.g., an action of a conductive tool capable of causing a change in capacitance). Meanwhile, the pen touch panel may be an electromagnetic induction type.

Particularly, the touch panel 132 detects a touch input for locking a document or unlocking a locked document. Additionally, the touch panel 132 detects a drag input that causes a folding action for setting a locked portion in a document, or an unfolding action for releasing a locked portion in a document. Also, the touch panel 132 detects a folding-finish touch input for completing the setting of a locked portion.

The control unit 140 controls the overall operation of the touch-sensitive device and a signal flow between internal components of the touch-sensitive device, performs a function to process data, and controls the supply of electric power from source such as a battery to such internal components.

Particularly, the control unit 140 controls the display unit 131 to display a document creation screen and/or a created document. When a touch input for locking a document is detected from a displayed document through the touch panel 132, the control unit 140 performs a document locking function. Similarly, when a touch input for unlocking a document is detected from a displayed and locked document through the touch panel 132, the control unit 140 performs a document unlocking function. Additionally, when a drag input is detected through the touch panel 132, the control unit 140 sets a locked portion by folding a document in the direction of the detected drag input. Similarly, when a drag input is detected through the touch panel 132, the control unit 140 releases a locked portion by unfolding a document in the direction of the detected drag input. Also, the control unit 140 controls the display unit 131 to display a password input window, and perform a document locking or unlocking function in response to a password input.

Although not shown nor described herein, in addition to the above-discussed elements, the touch-sensitive device may further include any other essential or optional element such as a GPS (Global Positioning System) module for receiving and acquiring location information, an audio processing unit having a microphone and a speaker, a camera module for capturing a still or moving image, an input unit based on a hard key, and the like. As will be understood by those skilled in the art, some of the above-mentioned elements in the touch-sensitive device may be omitted or replaced with another element.

In the following description of embodiments of the present disclosure, a document may be created by means of the execution of a specific application such as a memo, an email, a scheduler, an SNS, an SMS, or the like. In embodiments disclosed herein, methods for locking and unlocking a memo displayed on a memo screen will be described. This is, however, for example only and not to be considered as a limitation of the present disclosure. Additionally, a touch input of a predefined form may be set as an input for locking or unlocking a document. In embodiments disclosed herein, a long press touch input entered at a boundary of or in a display region of a document screen will be considered as an input for locking or unlocking a document. Specifically, if a document is not in a locked state, the control unit 140 recognizes a long press touch input as an input for locking the document, and then locks the content of the document by folding a displayed document. In contrast, if a document is in a locked state, the control unit 140 recognizes a long press touch input as an input for unlocking the document, and then unlocks the content of the document by unfolding a displayed and folded document.

Figure 2:
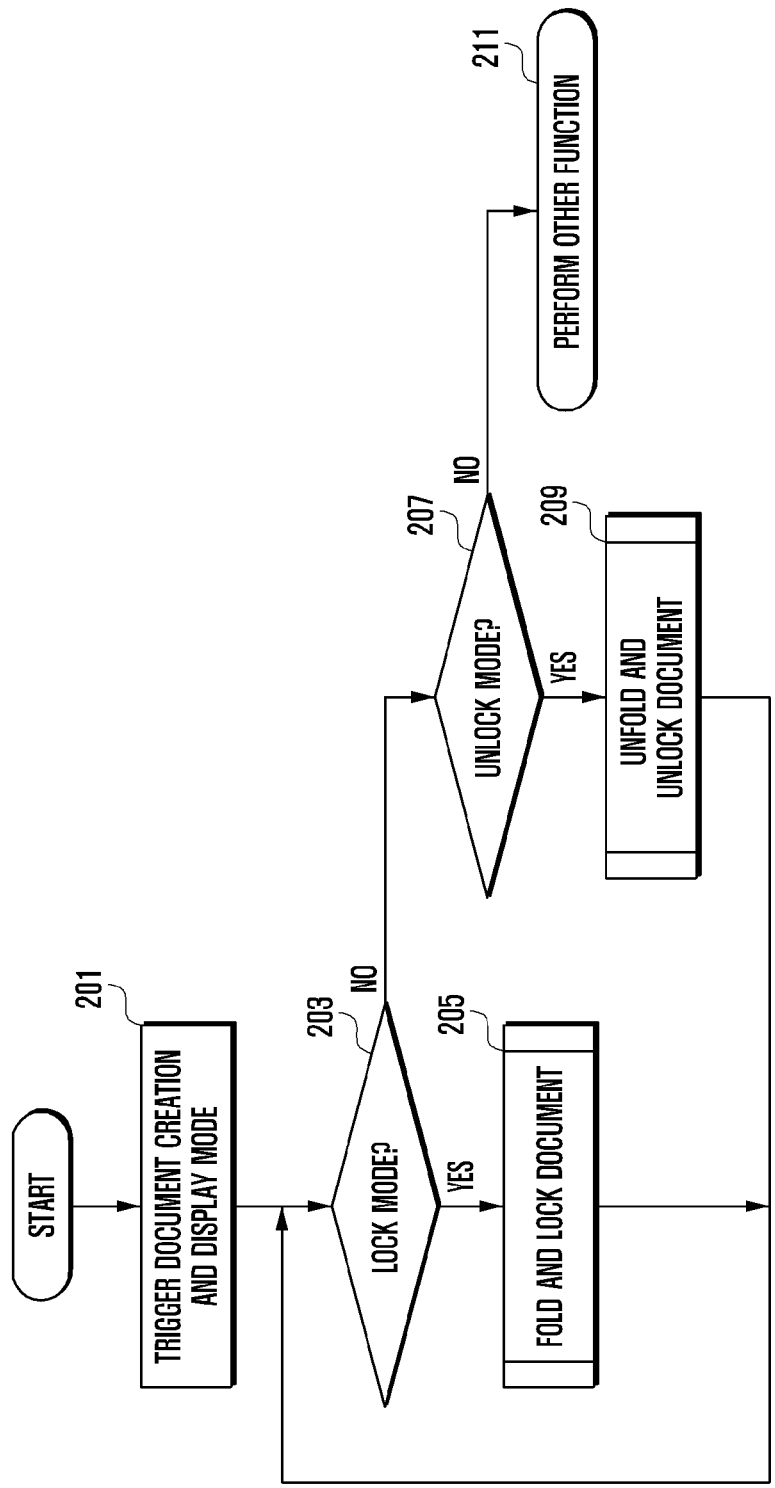
FIG. 2 is a flow diagram illustrating a method for locking or unlocking a document in a touch-sensitive device in accordance with an embodiment of the present disclosure.
Figure 3:
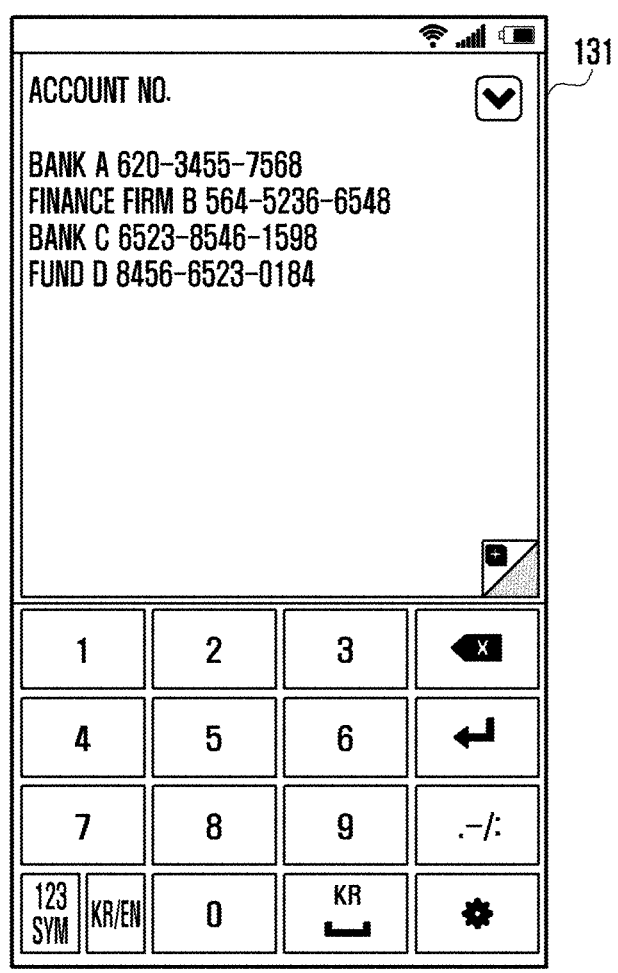
FIG. 3 is a screenshot illustrating a screen to support a document creation and display mode in accordance with an embodiment of the present disclosure.

FIG. 2 is a flow diagram illustrating a method for locking or unlocking a document in a touch-sensitive device in accordance with an embodiment of the present disclosure, and FIG. 3 is a screenshot illustrating a screen to support a document creation and display mode in accordance with an embodiment of the present disclosure.

Referring to FIGS. 2 and 3, at step 201, the control unit 140 triggers a document creation mode, also referred to as a new document mode, and displays a created document on the display unit 131. At step 203, the control unit 140 determines whether a current mode is a document lock mode or a document unlock mode, by checking whether a document is in a locked state or in an unlocked state. In the document lock mode, the control unit 140 detects the lock mode at step 203 and then folds a document at step 205 to lock the document in response to a user's input. In the document unlock mode, the control unit 140 detects the unlock mode at step 207 and then unfolds a folded document at step 209 to unlock the document in response to a user's input. If neither the lock mode or the unlock mode is detected, the control unit 140 performs other functions, such as a document creation, edit, deletion or share function, at step 211.

Figure 4:
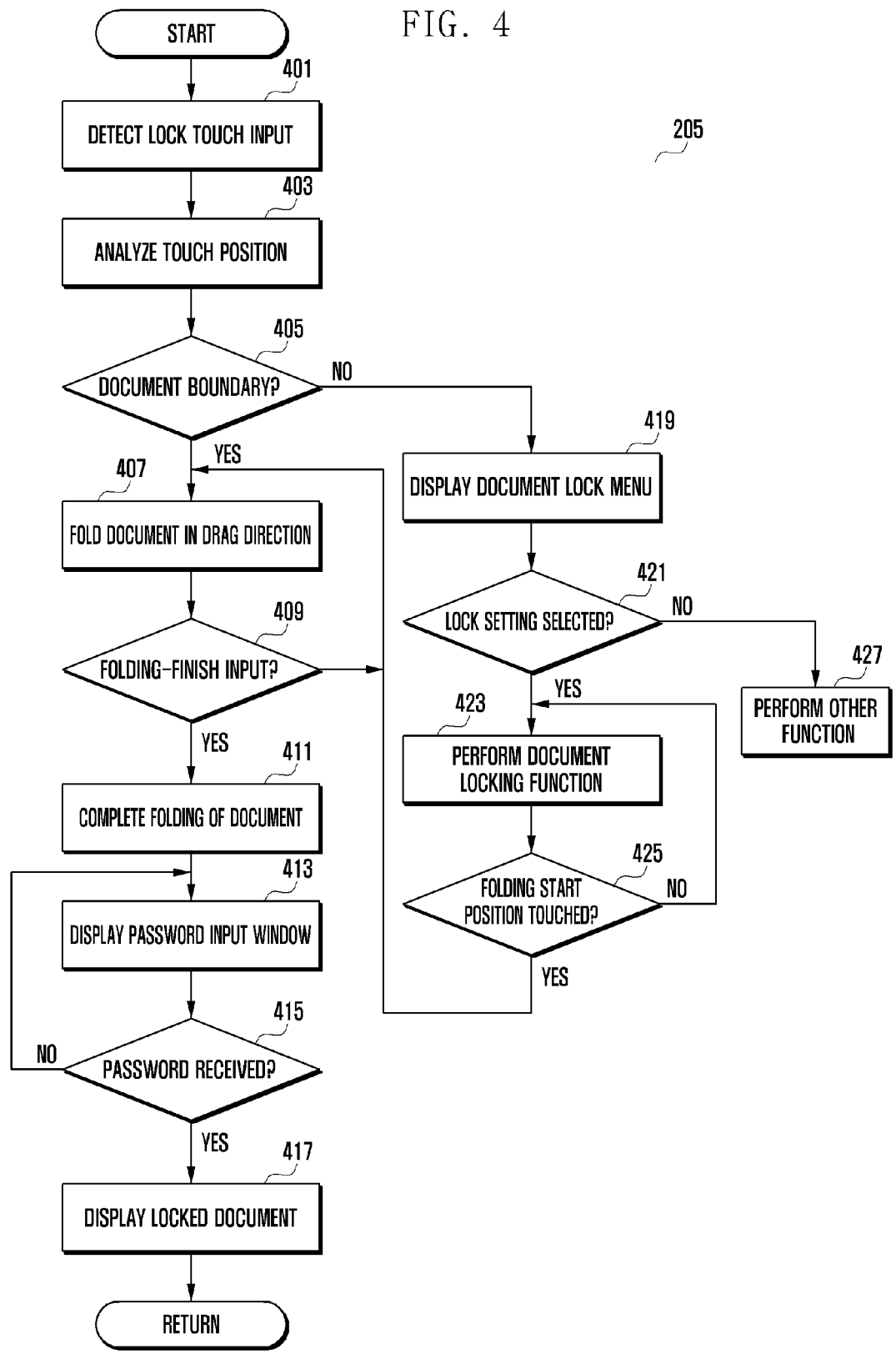
FIG. 4 is a flow diagram illustrating a detailed procedure of locking a document in a touch-sensitive device in accordance with an embodiment of the present disclosure.

A detailed procedure of step 205 shown in FIG. 2 may be performed as shown in FIG. 4. FIG. 4 is a flow diagram illustrating a detailed procedure of locking a document in a touch-sensitive device in accordance with an embodiment of the present disclosure, and FIGS. 5A to 5J are screenshots illustrating various processes of locking a document in a touch-sensitive device in accordance with embodiments of the present disclosure.

Referring to FIGS. 4 and 5A to 5J, if a long press touch input is detected through the touch panel 132 while an unlocked document is displayed on the display unit 131, the control unit 140 recognizes the detected touch input as an input for locking a document at step 401 and then analyzes a touch position at step 403. A touch input may be entered at a boundary of or in a display region of a document. Such a boundary may include an edge or a corner. By analysis of the touch position, the control unit 140 determines at step 405 whether the touch input occurs at a boundary of a document or in a display region of a document.

Figure 5A:
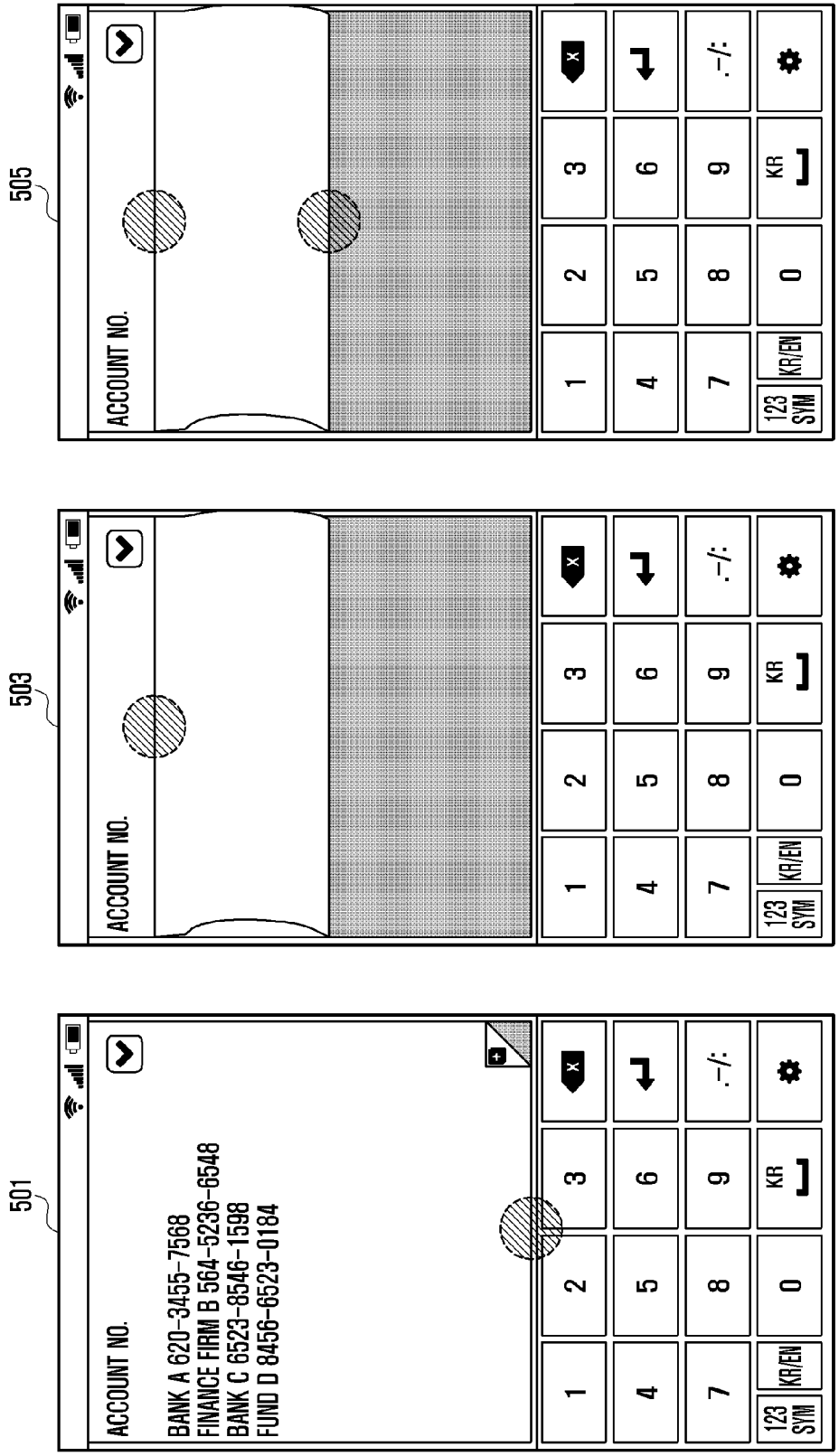
Figure 5B:
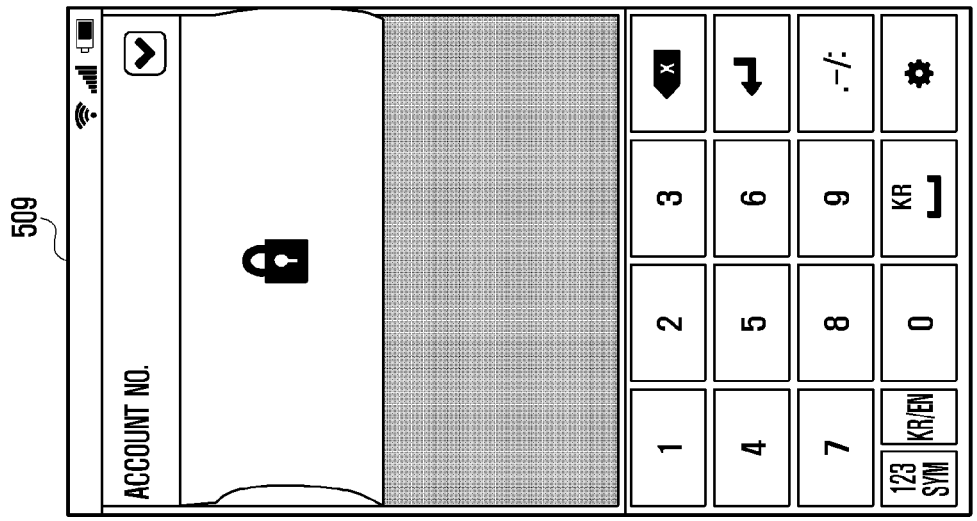
Figure 5B:
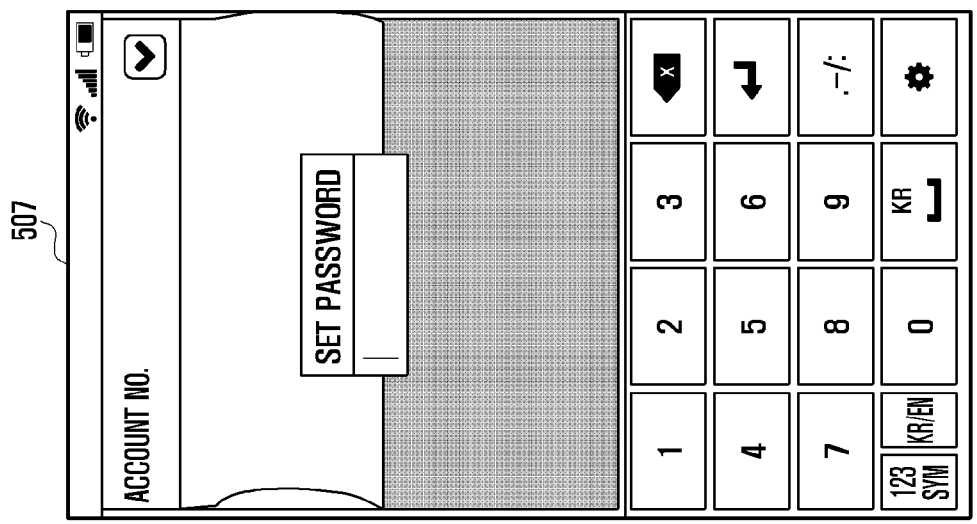

If a touch input occurs at a boundary of a document as shown in a screenshot 501 of FIG. 5A or a screenshot 535 of FIG. 5H, the control unit 140 recognizes at step 405 that a touch input occurs at a boundary of a document, then analyzes a drag direction, and folds a document in the analyzed drag direction at step 407. Namely, when a long press touch is detected at a boundary of a document, the control unit 140 sets a detected touch position as a start position of a document lock and then folds a document according to a drag direction and distance detected through the touch panel 132. Folding of a document may be performed from bottom to top as shown in a screenshot 503 of FIG. 5A, from top to bottom as shown in a screenshot 517 of FIG. 5D, from left to right as shown in a screenshot 519 of FIG. 5E, from right to left as shown in a screenshot 521 of FIG. 5E, from a lower right corner to an upper left corner as shown in a screenshot 523 of FIG. 5E, or from a lower left corner to an upper right corner (not shown). The extent of such folding may depend on a drag distance. Additionally, such folding may be performed several times in two or more directions. For example, after folding from a lower right corner to an upper left corner, a document may be folded again in any selected direction.

At step 409, the control unit 140 detects a folding-finish touch input and therefore stops a folding action. In some embodiments, a folding-finish touch input may be a multi touch, which is, however, only an example and not to be considered as a limitation of this disclosure. When a folding-finish touch input occurs, the control unit 140 detects the input at step 409 and then completes a setting of a locked portion in a document at step 411 when folding of the document is completed. For example, when a document is folded from bottom to top as shown in screenshots 501 and 503 of FIG. 5A, the control unit 140 completes setting a locked portion of the document in response to a multi touch as shown in a screenshot 505 of FIG. 5A. Similarly, when a document is folded at a middle portion as shown in screenshots 525 and 527 of FIG. 5F, the control unit 140 completes setting a locked portion of the document in response to a multi touch as shown in a screenshot 529 of FIG. 5F. Similarly, when a document is folded from top to bottom as shown in screenshots 535 and 537 of FIG. 5H, the control unit 140 completes setting a locked portion of the document in response to a multi touch as shown in a screenshot 539 of FIG. 5H.

If a drag input is removed without such a folding-finish touch input in step 409, the procedure returns to step 407. Namely, a user may perform a document locking function by folding a document once, twice, or more. Specifically, once a document is folded through a drag input in one direction, a user can fold the folded document again through a further drag input in another direction. For example, a user may perform a drag input in a direction from an upper left corner to a lower right corner, and then perform a further drag input in a direction from lower right corner to an upper left corner. In this case, the control unit 140 folds a document in response to a drag input from an upper left corner, and then folds the document again in response to a further drag input from a lower right corner.

If a folding-finish touch input is detected in step 409, the control unit 140 completes a setting of a document locked portion at step 411. Then, at step 413, the control unit 140 controls the display unit 131 to display a password input window as shown in a screenshot 507 of FIG. 5B, a screenshot 531 of FIG. 5G, and a screenshot 541 of FIG. 5I. Instead of a password input in the disclosed embodiments, a lock pattern input may be alternatively used. At step 415, the control unit 140 detects a password input in the password input window. If the password is received then, at step 417, the control unit 140 controls the display unit 131 to display the locked document, namely, the folded document, as shown in a screenshot 509 of FIG. 5B, a screenshot 533 of FIG. 5G, and a screenshot 543 of FIG. 5I. At this time, the control unit 140 further controls the display unit 131 to show a locked state of a document by showing a lock icon such as a safety lock on the folded document. If there is no password input in step 415, the procedure returns to step 413.

As discussed hereinabove, if a touch input for locking a document is detected from a boundary of a displayed document, the control unit 140 triggers a document locking function and then folds the document by detecting the direction of a drag input. Additionally, a drag input may be entered once, twice, or more, and the control unit 140 may fold the document in the direction of each drag input such that a part or whole of the document may be not exposed.

Figure 5C:
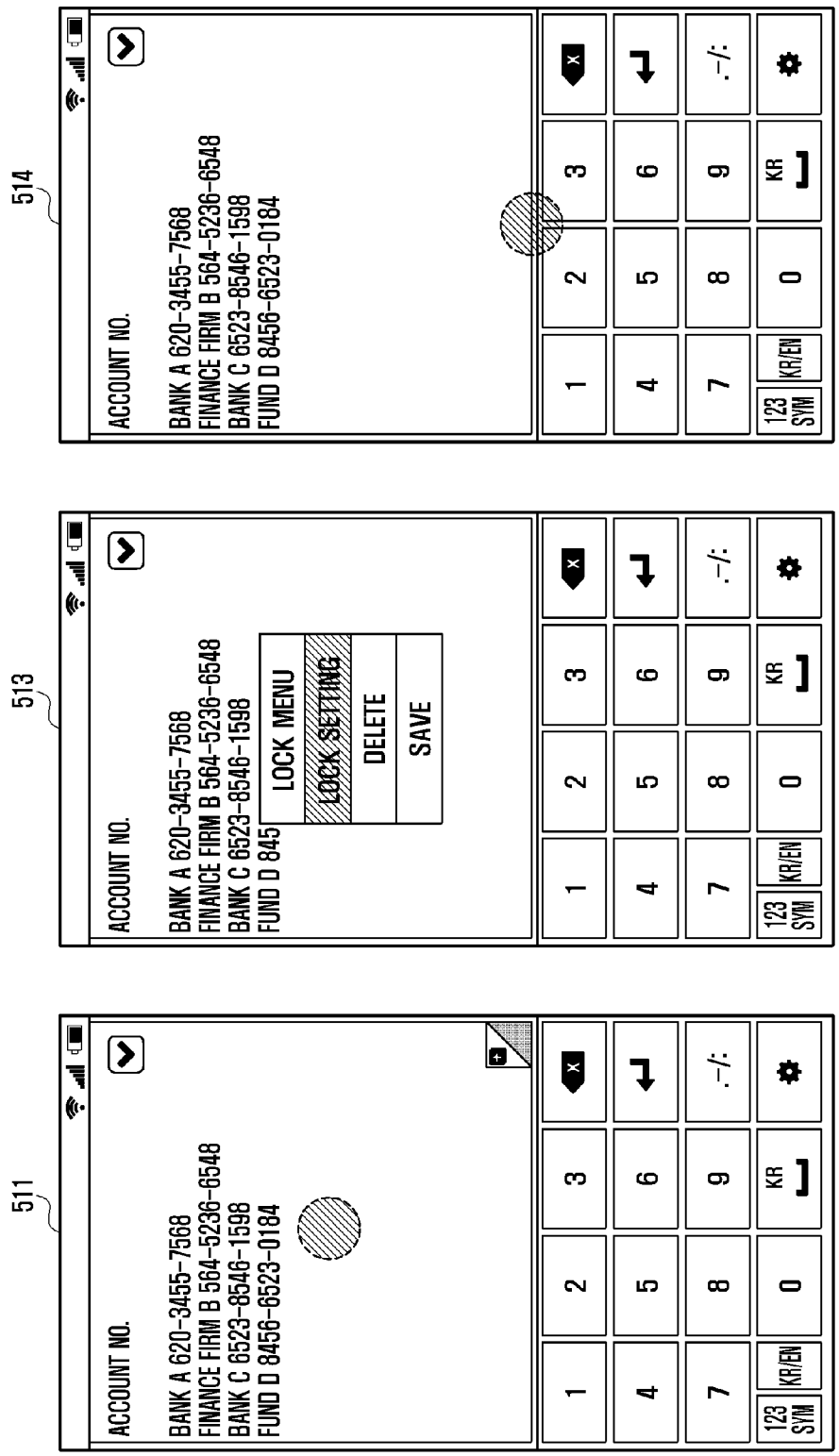
Figure 5D:
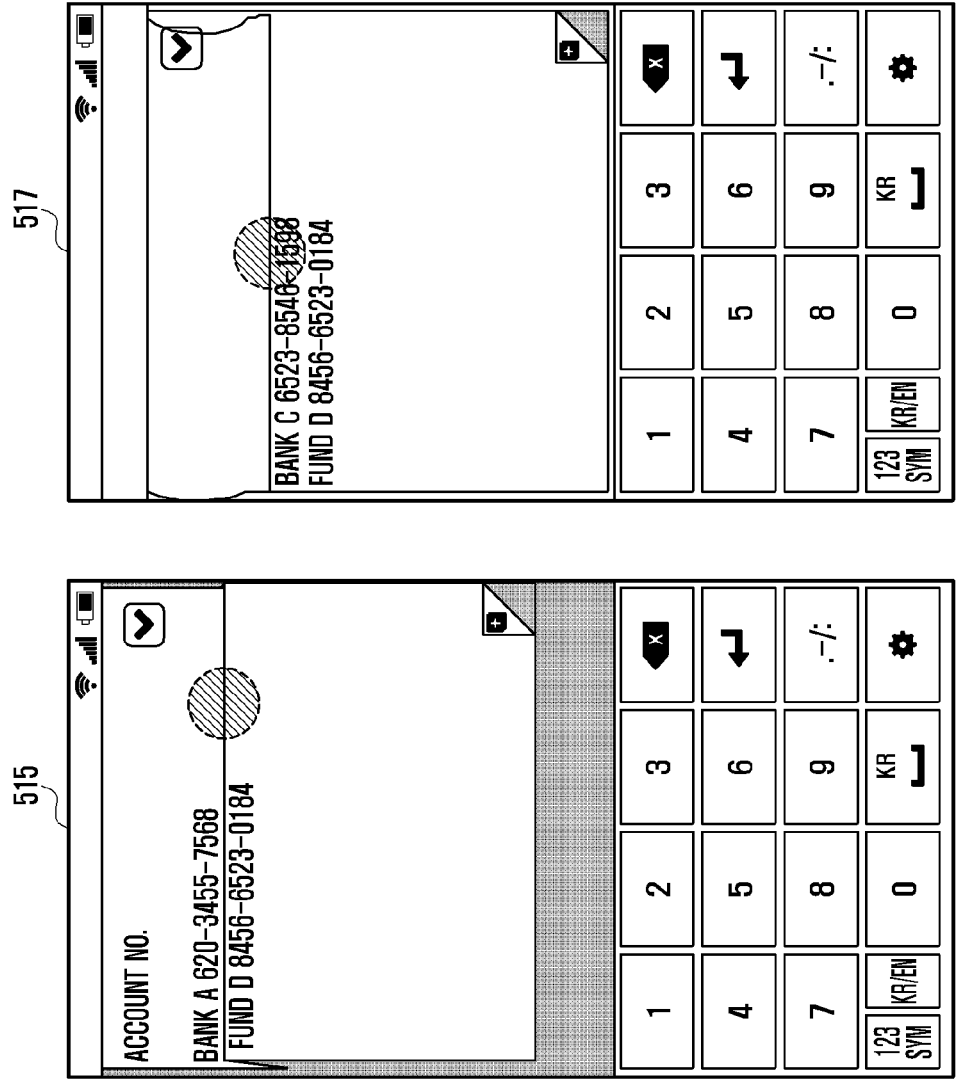
Figure 5E:
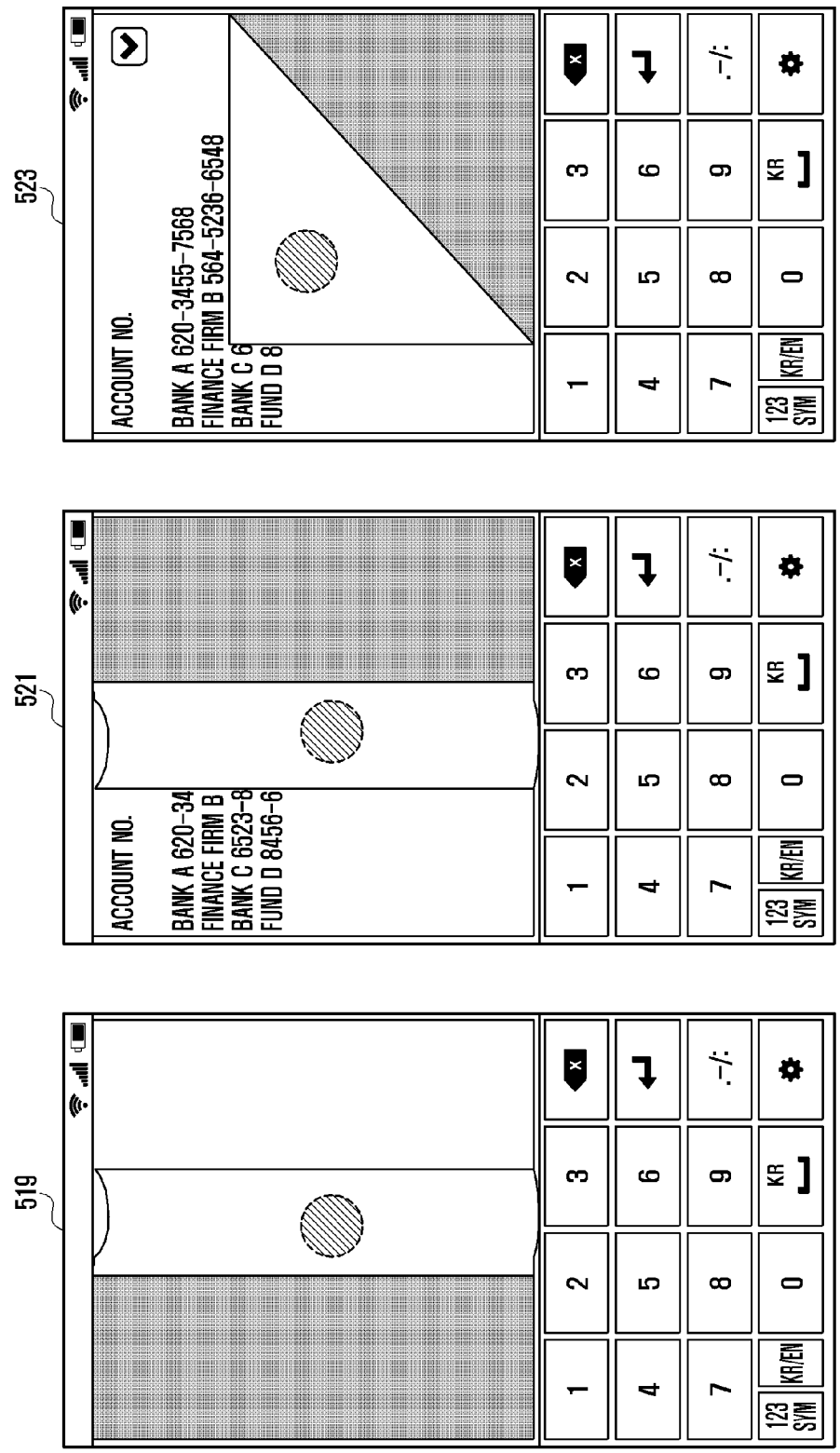
Figure 5G:
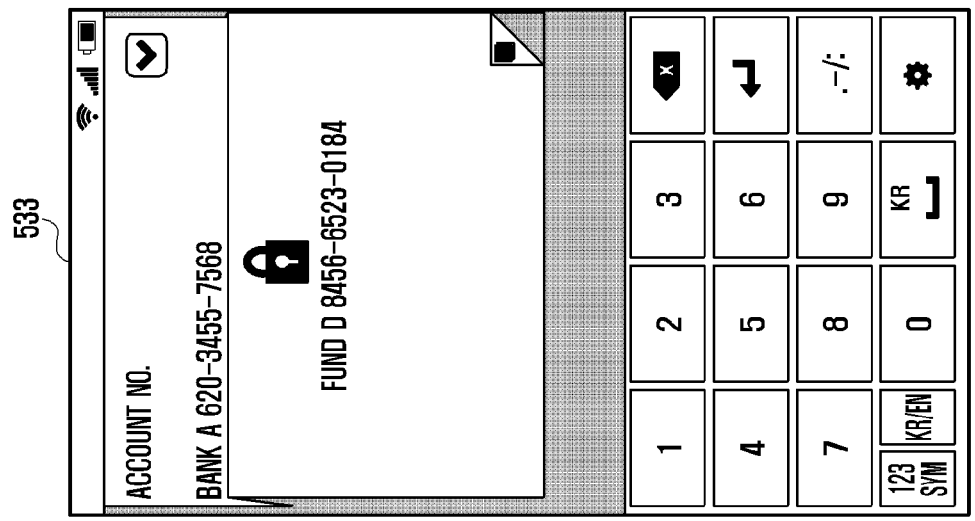
Figure 5G:
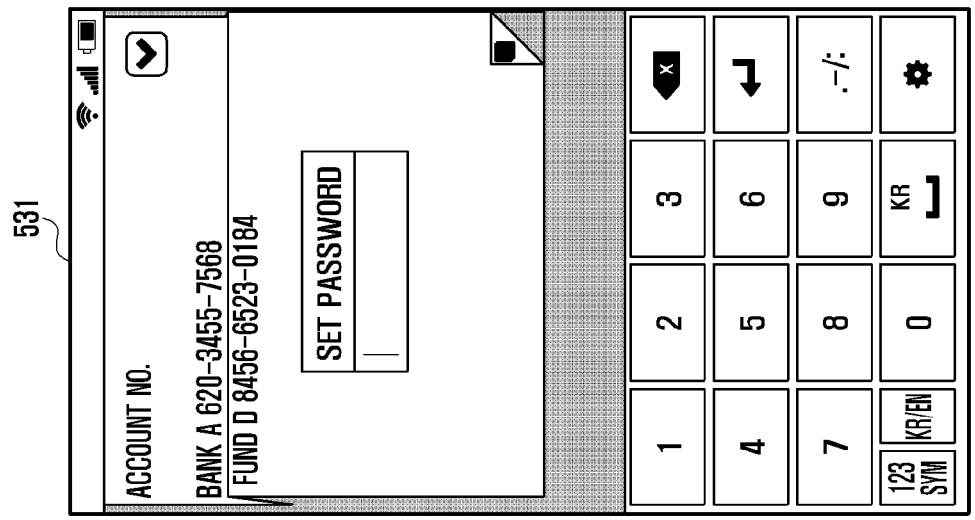
Figure 5I:
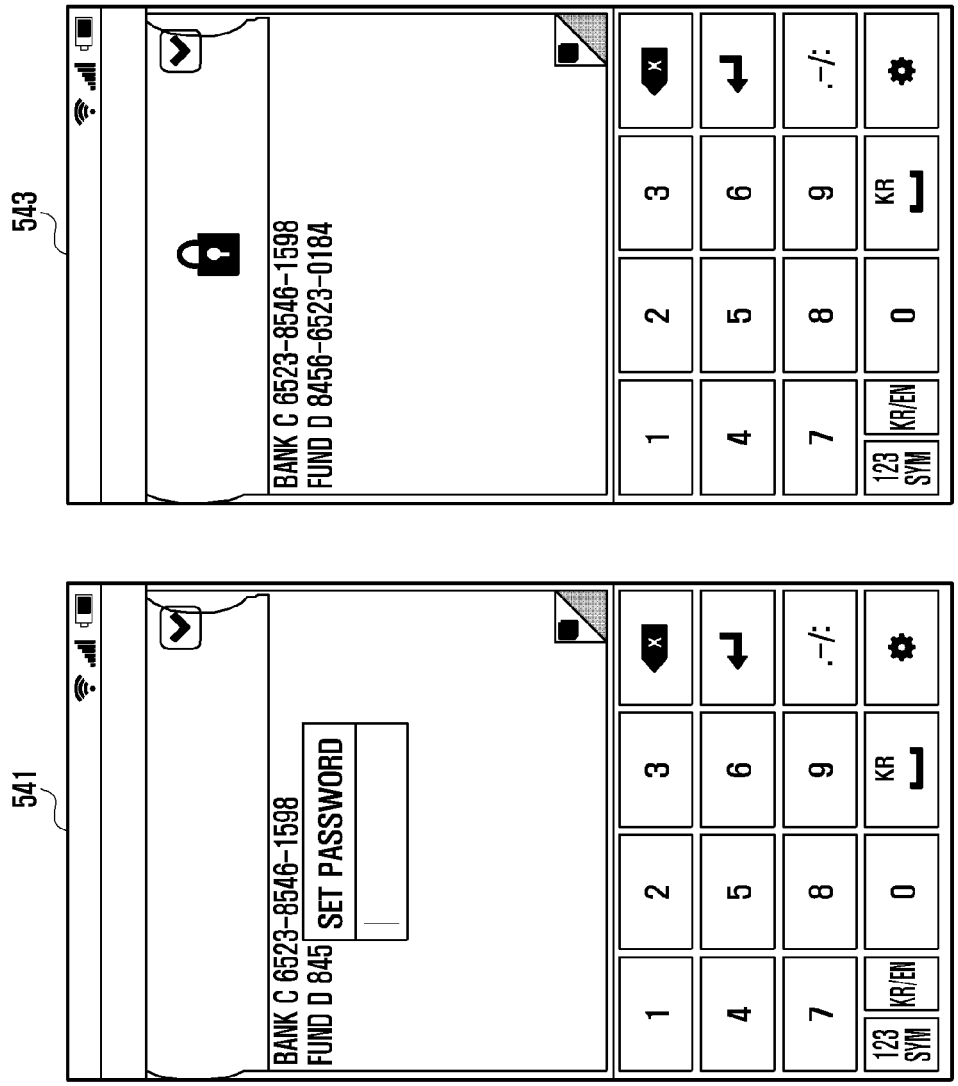
Figure 5J:
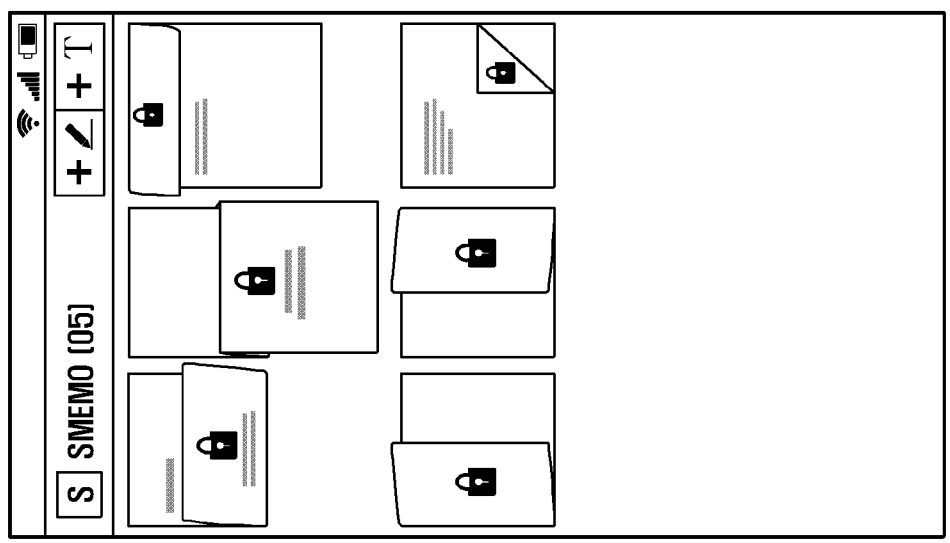

If a touch input does not occur at a boundary of a document at step 405, the control unit 140 determines that a touch input occurs in a display region of a document as shown in a screenshot 511 of FIG. 5C and a screenshot 525 of FIG. 5F. When a touch input is detected on a display region of a document, the control unit 140 controls the display unit 131 to display a document lock menu at step 419 as shown in a screenshot 513 of FIG. 5C. At step 421, the control unit 140 determines whether a "lock setting" is selected in a document lock menu. If a "lock setting" is selected, the control unit 140 performs a document locking function at step 423. Then, at step 425, the control unit 140 determines whether a touch input for designating a folding start position is detected through the touch panel 132. If such a touch input is detected at step 425, the control unit 140 performs the above-discussed steps 407 to 417. For example, if a touch input is detected from a boundary of a document as shown in a screenshot 514 of FIG. 5C, the control unit 140 locks the document by folding the document in a drag direction from the boundary position. Similarly, if a touch input is detected from a middle portion of a document as shown in a screenshot 525 of FIG. 5F, the control unit 140 locks the document by folding the document in a drag direction from the middle portion as shown in a screenshot 527 of FIG. 5F. Thereafter, as shown in FIG. 5J, the control unit 140 controls the display unit 131 to display locked documents in the form of thumbnails. If a "lock setting" is not selected at step 421, the control unit 140 performs at step 427 any other selected function to save, share, or delete a document.

As discussed hereinabove, if a touch input for locking a document is detected from a display region of a document, the control unit 140 outputs a document lock menu and triggers a document locking function. Then, based on a touch and drag input, the control unit 140 designates a folding start position and folds the document in a drag direction. Such a touch and drag input may be entered once, twice, or more, and the control unit 140 may fold the document in each drag direction such that a part or whole of the document may be not exposed.

Returning to FIG. 2, if a document is not in a lock mode at step 203, the control unit 140 determines whether a current mode is a document unlock mode at step 207. If a document is in an unlock mode, the control unit 140 unlocks a document at step 209 by unfolding a folded document through the procedure shown in FIG. 6.

Figure 6:
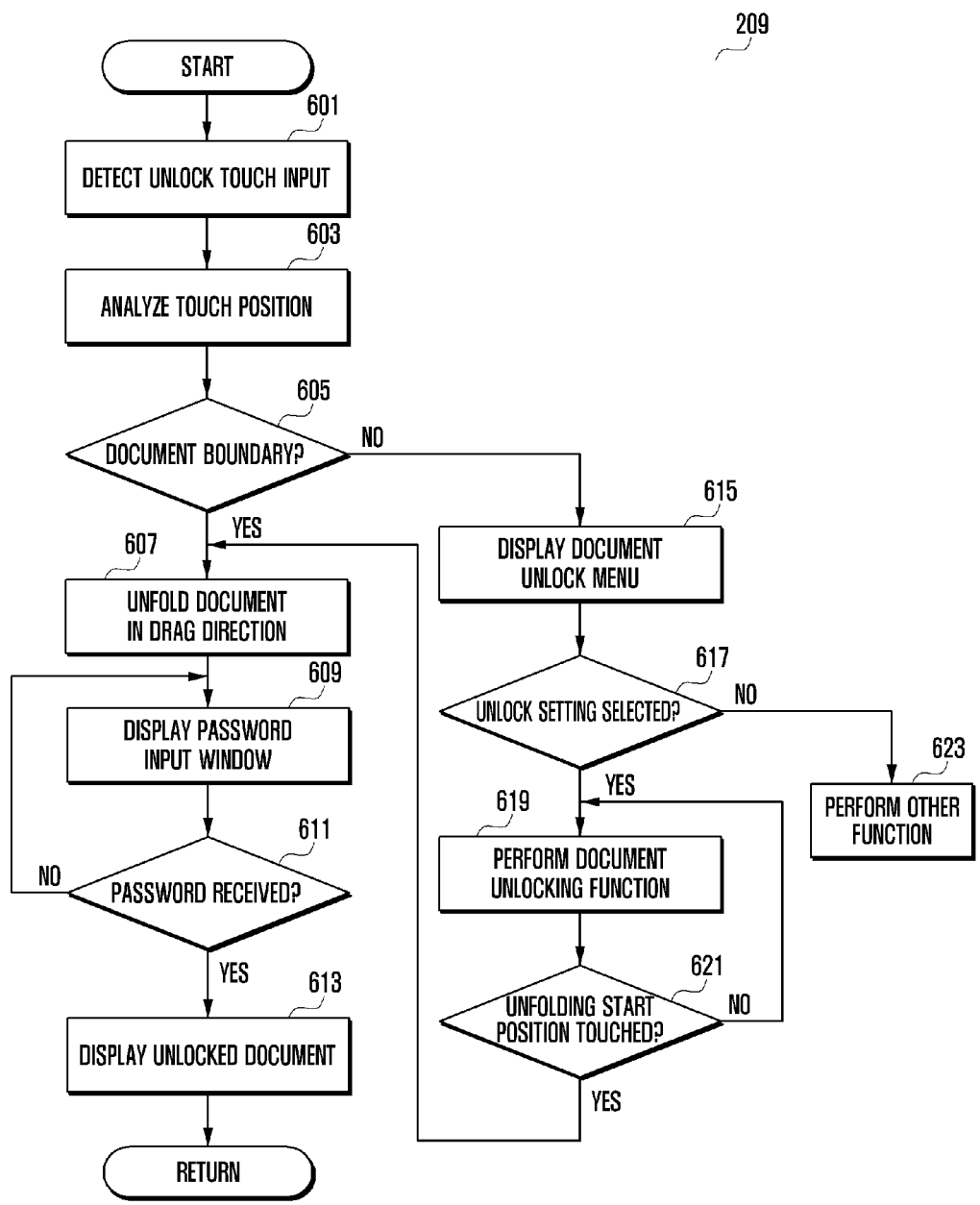
FIG. 6 is a flow diagram illustrating a detailed procedure of unlocking a document in a touch-sensitive device in accordance with an embodiment of the present disclosure.

FIG. 6 is a flow diagram illustrating a detailed procedure of unlocking a document in a touch-sensitive device in accordance with an embodiment of the present disclosure, and FIGS. 7A to 7E are screenshots illustrating various processes of unlocking a document in a touch-sensitive device in accordance with embodiments of the present disclosure.

Figure 7A:
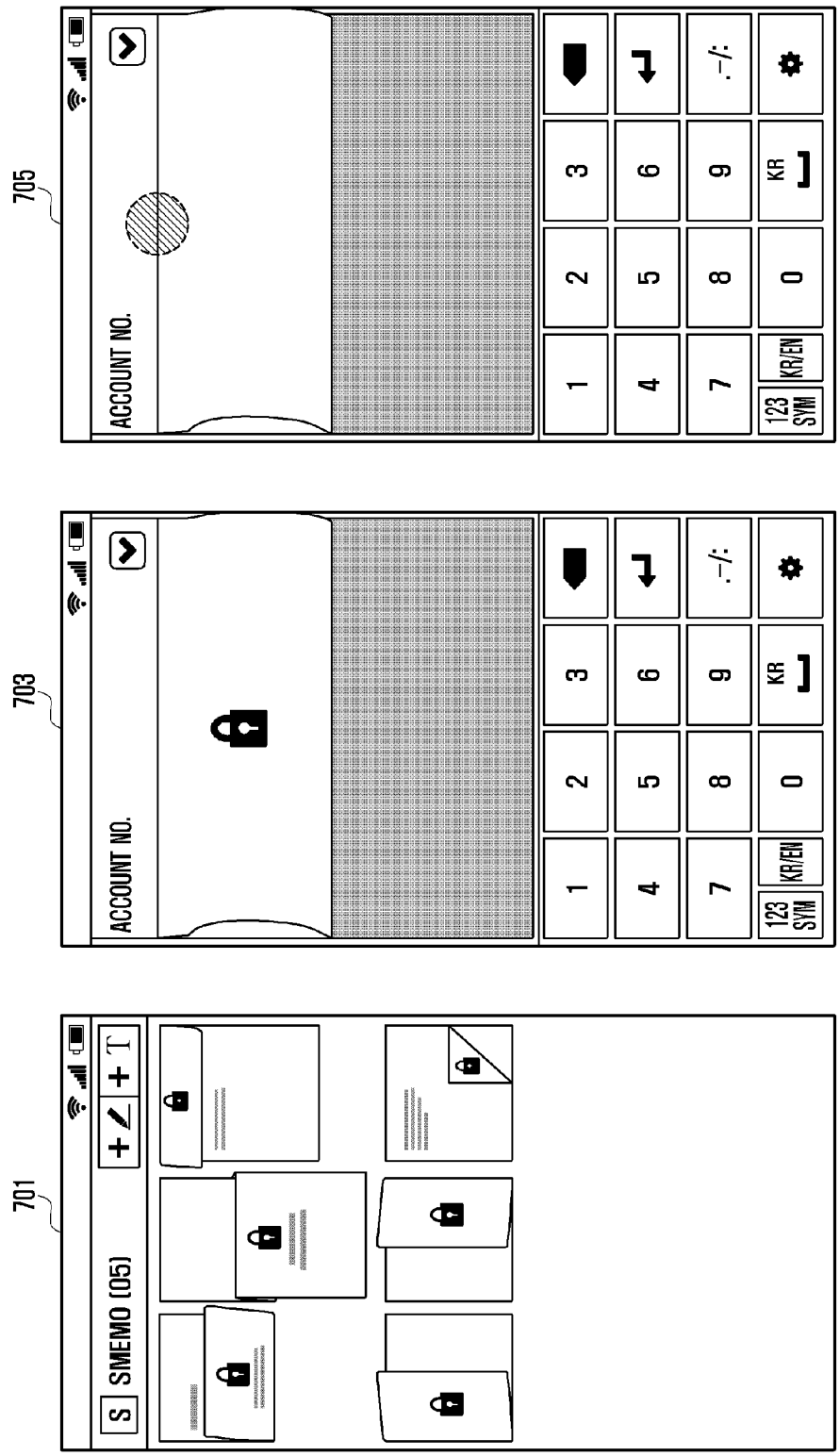

Referring to FIGS. 6 and 7A to 7E, the control unit 140 controls the display unit 131 to display locked documents in the form of thumbnail images as shown in a screenshot 701 of FIG. 7A. At this time, a locked document is a folded document in which a part or whole of content cannot be seen. These documents may be folded once, twice, or more. The control unit 140 detects an input for selecting one of locked documents displayed as thumbnail images. If any locked document is selected, the control unit 140 detects it through the touch panel 132 and controls the display unit 131 to display the selected document as shown in a screenshot 703 of FIG. 7A. Then the control unit 140 detects a touch input for unlocking the locked document through the touch panel 132 at step 601, and analyzes a touch position at step 603. A touch input may be entered at a boundary of or in a display region of a document. Such a boundary may include an edge or a corner. By analyzing the touch position, the control unit 140 determines at step 605 whether a touch input occurs at a boundary of a document or in a display region of a document.

If a touch input occurs at a boundary of a document as shown in a screenshot 705 of FIG. 7A, the control unit 140 recognizes at step 605 that a touch input happens at a boundary of a document, analyzes a drag direction, and unfolds a document in the analyzed drag direction at step 607. Namely, when a long press touch is detected at a boundary of a document, the control unit 140 sets a detected touch position as a start position of a document unlock and then unfolds a folded document. Unfolding of a document may be performed from top to bottom as shown in a screenshot 705 of FIG. 7A, from bottom to top as shown in a screenshot 717 of FIG. 7D, from right to left as shown in a screenshot 719 of FIG. 7E, from left to right as shown in a screenshot 721 of FIG. 7E, from an upper left corner to a lower right corner as shown in a screenshot 723 of FIG. 7E, or from an upper right corner to a lower left corner (not shown).

Figure 7B:
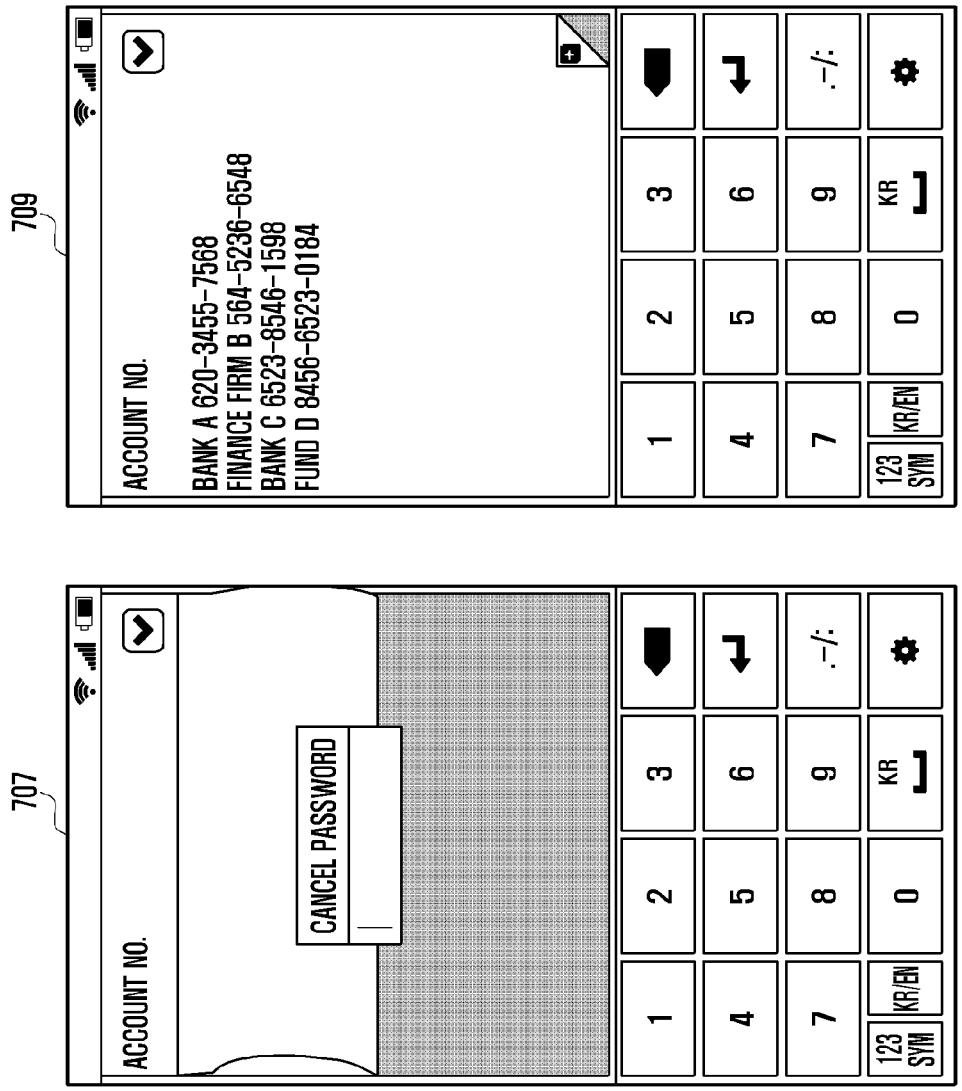

After a document is unfolded, the control unit 140 controls the display unit 131 to display a password input window as shown in a screenshot 707 of FIG. 7B at step 609. Instead of a password input in disclosed embodiments, a lock pattern input may be alternatively used to unlock a document. At step 611, the control unit 140 detects a password input from a password input window through the touch panel 132. Then the control unit 140 determines whether the detected password is identical to a predefined password. If identical, the control unit 140 unlocks a locked document at step 613 and then controls the display unit 131 to display an unlocked document as shown in a screenshot 709 of FIG. 7B. If the detected password is not identical to a predefined password, the procedure returns to step 609.

Figure 7C:
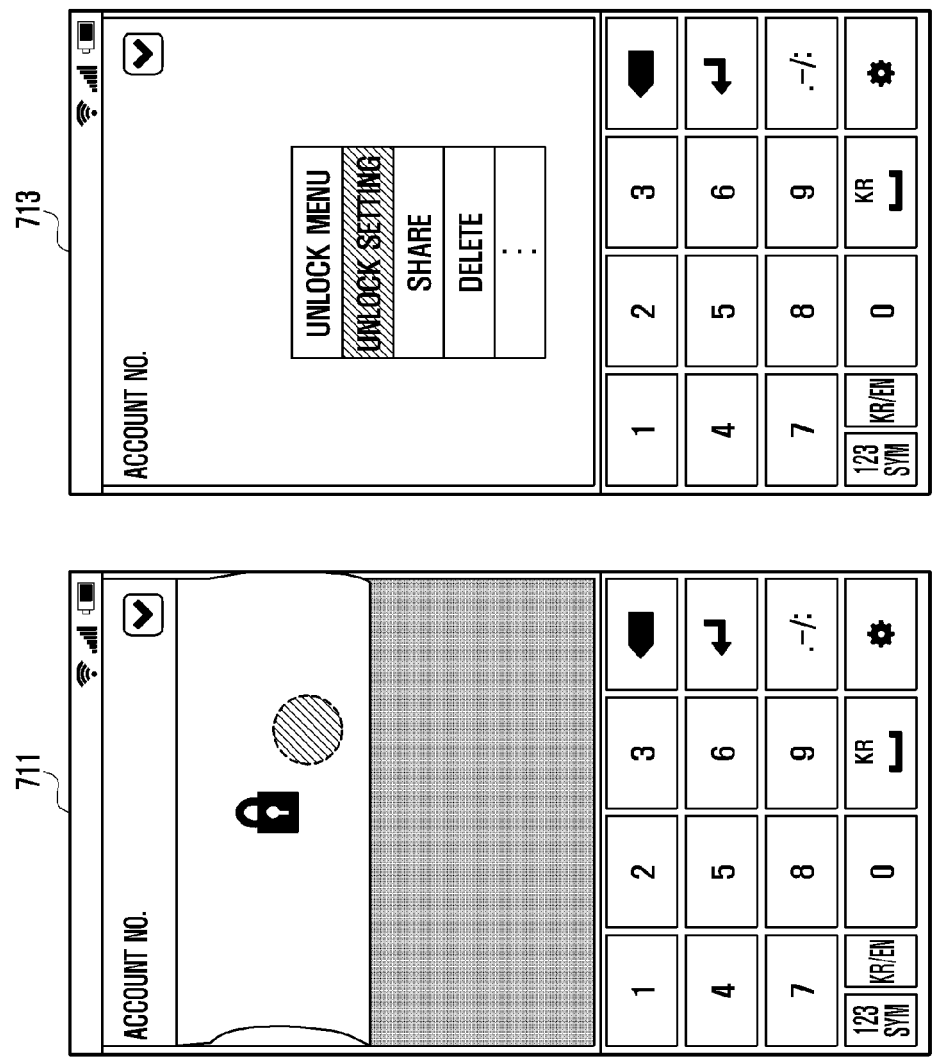
Figure 7D:
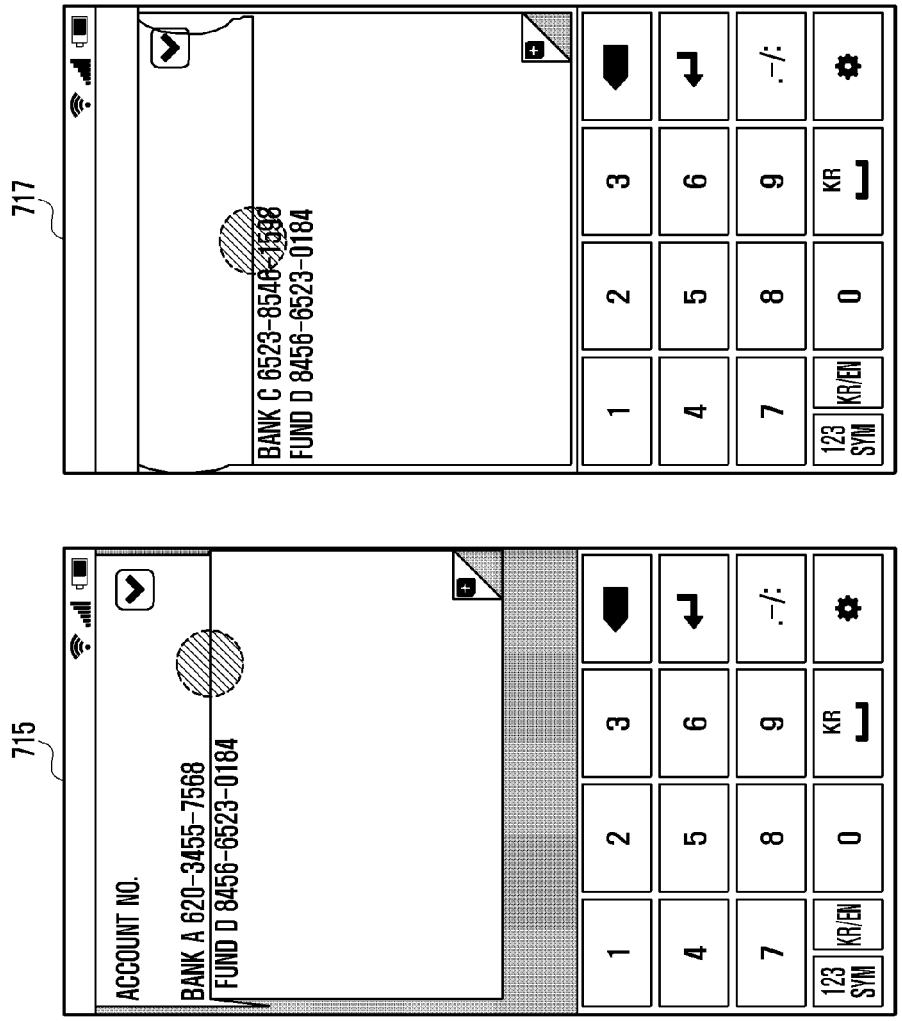

If a touch input does not occur at a boundary of a document at step 605, the control unit 140 determines that a touch input occurs within a locked document as shown in a screenshot 711 of FIG. 7C. When a touch input is detected within a locked document, the control unit 140 controls the display unit 131 to display a document unlock menu at step 615 as shown in a screenshot 713 of FIG. 7C. At step 617, the control unit 140 determines whether an "unlock setting" is selected in a document unlock menu. If an "unlock setting" is selected, the control unit 140 performs a document unlocking function at step 619. Then, at step 621, the control unit 140 determines whether a touch input for designating an unfolding start position is detected through the touch panel 132. If such a touch input is detected at step 621, the control unit 140 performs the above-discussed steps 607 to 613. For example, if a touch input is detected from a boundary of a document, the control unit 140 unlocks the document by unfolding a folded portion of the document. Similarly, if a touch input is detected from a middle portion of a document, the control unit 140 unlocks the document by unfolding the document in a drag direction from the middle portion as shown in a screenshot 715 of FIG. 7D. If an "unlock setting" is not selected at step 617, the control unit 140 performs at step 623 any other selected function to share or delete a document.

As discussed hereinabove, if a touch input for unlocking a document is detected within a locked document, the control unit 140 outputs a document unlock menu and triggers a document unlocking function. Then, based on a touch and drag input, the control unit 140 designates an unfolding start position and unfolds the locked document in a drag direction. Such a touch and drag input may be entered once, twice, or more, and the control unit 140 may unfold the document in each drag direction such that a part or whole of the document may be seen again.

While the present disclosure has been particularly shown and described with reference to a certain embodiment thereof, it will be understood by those skilled in the art that various changes in form and details may be made therein without departing from the spirit and scope of the disclosure as defined by the appended claims.

What is claimed is:
1. A method for processing a document in a touch-sensitive device, the method comprising:
   displaying the document including contents;
   executing a document lock mode when a first touch input, for folding the document, is detected;

folding, by a control unit, at least a portion of the document based on a direction and a distance of a first drag input from a position of the detected first touch input; and locking the at least the portion of the document to hide a portion of the contents corresponding to the folded at least the portion of the document, when a second touch input, for completing the folding of the document, is detected while the first touch input is detected, wherein the first touch input and the first drag input start from a boundary of the document or within the document.

2. The method of claim 1, further comprising:
when a third touch input for displaying the hidden portion of the contents is detected, displaying the hidden portion of the contents by unfolding the folded at least the portion of the document in a direction of a second drag input from a position the third touch input.

3. The method of claim 1, further comprising:
displaying a password input window to receive a password for the hidden portion of the contents, when the second touch input is detected.

4. The method of claim 1, wherein the first touch input is detected within the document.

5. The method of claim 1, wherein the first touch input is detected at the boundary of the document.

6. The method of claim 1, wherein the first touch input comprises a long press touch.

7. The method of claim 5, wherein the boundary is an edge of the document or a corner of the document.

8. The method of claim 1, wherein folding the at least the portion of the document comprises:
setting, as a start position, a specific position from which the first touch input is detected; and
folding the document based on a direction and a distance of the first drag input from the start position.

9. The method of claim 1, wherein folding the at least the portion of the document comprises:
displaying a document lock menu when the first touch input is detected; and
when a touch and drag input is detected, folding the at least the portion of the document in a drag direction from a touch position.

10. The method of claim 9, wherein the touch and drag input starts from the boundary of the document or within the document.

11. The method of claim 3, further comprising:
displaying a document lock icon on the hidden portion of the contents.

12. The method of claim 2, wherein displaying the hidden portion of the contents comprises:
when the third touch input is detected, displaying a password input window to receive a password; and
when the received password is identical to a predefined password, displaying the hidden portion of the contents.

13. The method of claim 12, wherein the third touch input comprises a long press touch.

14. An apparatus for processing a document in a touch-sensitive device, the apparatus comprising:
a touch panel configured to detect a first touch input, a second touch input, and a third touch input;
a display unit configured to display the document including contents; and
a control unit configured:
to execute a document lock mode when the first touch input, for folding the document, is detected,
to fold at least a portion of the document based on a direction and a distance of a first drag input from a position of the detected first touch input,
to lock the at least the portion of the document to hide a portion of the contents corresponding to the folded at least the portion of the document, when the second touch input, for completing the folding of the document, is detected while the first touch input is detected, and
to control the display unit to display the hidden portion of the contents by unfolding the folded at least the portion of the document based on a direction and a distance of a second drag input from a position of the third touch input, when the third touch input, for displaying the hidden portion of the contents, is detected through the touch panel,
wherein the first touch input and the first drag input start from a boundary of the document or within the document.

15. The apparatus of claim 14, wherein the control unit is further configured to control the display unit to display a password input window, when the third touch input is detected, and to receive a password for the hidden portion of the contents through the password input window.

16. The apparatus of claim 14, wherein the control unit is further configured to set, as a start position, a specific position from which the first touch input is detected, and to fold the document based on the direction and the distance of the first drag input from the start position.

17. The apparatus of claim 14, wherein the first touch input is detected within the document, an edge of the document or a corner of the document.

18. The apparatus of claim 14, wherein the control unit is further configured to control the display unit to display a document lock menu when the first touch input is detected, and to fold the at least the portion of the document in a drag direction from a touch position, when a touch and drag input is detected.

19. The apparatus of claim 18, wherein the touch and drag input starts from the boundary of the document or within the document.

20. The apparatus of claim 15, wherein the control unit is further configured to control the display unit to display a document lock icon on the hidden portion of the contents.

* * * * *